United States Patent [19]
Haerle

[11] Patent Number: 5,204,067
[45] Date of Patent: Apr. 20, 1993

[54] FILTER

[75] Inventor: Hans A. Haerle, Bopfingen, Fed. Rep. of Germany

[73] Assignee: Schwaebische Huettenwerke GmbH, Fed. Rep. of Germany

[21] Appl. No.: 728,560

[22] Filed: Jul. 11, 1991

[51] Int. Cl.$^5$ .............. B01D 39/14; B01D 46/10; B01D 46/48; B01J 35/04; F01N 3/24; F01N 3/02

[52] U.S. Cl. .................. 422/177; 422/180; 55/484; 55/523; 55/DIG. 30; 60/311

[58] Field of Search ............. 422/177, 180; 55/484, 55/523, DIG. 30; 60/311

[56] References Cited

U.S. PATENT DOCUMENTS

| | | | |
|---|---|---|---|
| 2,267,918 | 12/1941 | Hildabolt | 428/547 |
| 3,087,233 | 4/1963 | Turnbull | 428/605 |
| 3,161,478 | 12/1964 | Chessin | 428/613 |
| 3,306,353 | 2/1967 | Burne | 165/164 |
| 3,819,334 | 6/1974 | Yoshida et al. | 422/180 X |
| 3,904,551 | 9/1975 | Lundsager et al. | 502/241 |
| 4,062,807 | 12/1977 | Suzuki | 502/177 |
| 4,064,914 | 12/1977 | Grant | 138/142 |
| 4,220,625 | 9/1980 | Toh et al. | 422/180 |
| 4,301,012 | 11/1981 | Puckett | 210/457 |
| 4,329,162 | 5/1982 | Pitcher, Jr. | 55/523 |
| 4,359,864 | 11/1982 | Bailey | 60/311 |
| 4,417,908 | 11/1983 | Pitcher, Jr. | 60/311 X |
| 4,515,758 | 5/1985 | Domesle et al. | 423/213.2 |
| 4,652,286 | 3/1987 | Kusuda et al. | 35/523 |
| 4,662,915 | 5/1987 | Shirai et al. | 55/511 |
| 4,687,579 | 8/1987 | Bergman | 210/347 |
| 4,725,411 | 2/1988 | Cornelison | 422/180 |
| 4,732,593 | 3/1988 | Kondo et al. | 55/523 |
| 4,758,272 | 7/1988 | Pierotti et al. | 75/246 |
| 4,760,047 | 7/1988 | Jeschke et al. | 502/439 |
| 4,869,738 | 9/1989 | Alcorn | 55/523 |
| 4,889,630 | 12/1989 | Reinhardt et al. | 210/490 |
| 4,942,020 | 7/1990 | Whittenberger | 422/222 X |
| 4,971,769 | 11/1990 | Haerle | 422/171 |
| 4,981,172 | 1/1991 | Haerle | 165/133 |
| 5,009,857 | 4/1991 | Haerle | 422/180 |
| 5,070,694 | 12/1991 | Whittenberger | 422/174 X |
| 5,089,236 | 2/1992 | Clerc | 422/177 |

FOREIGN PATENT DOCUMENTS

| | | |
|---|---|---|
| 42301 | 12/1981 | European Pat. Off. . |
| 2951316 | 7/1981 | Fed. Rep. of Germany ...... 422/180 |
| 3901609 | 7/1990 | Fed. Rep. of Germany . |
| 3937809 | 5/1991 | Fed. Rep. of Germany . |
| 745462 | 5/1933 | France . |
| 1453653 | 9/1966 | France . |
| 2462188 | 2/1981 | France . |
| 54-128842 | 10/1979 | Japan . |
| 54-152241 | 11/1979 | Japan . |
| 61-287451 | 12/1986 | Japan . |
| 62-225221 | 10/1987 | Japan . |
| 9002603 | 3/1990 | World Int. Prop. O. .......... 422/180 |

*Primary Examiner*—Robert J. Warden
*Assistant Examiner*—Stephanie Blythe
*Attorney, Agent, or Firm*—Welsh & Katz, Ltd.

[57] ABSTRACT

A filter for the separation of impurities from exhaust gases, and in particular, from the exhaust gases of an internal combustion engine, is disclosed. The filter is provided with a filter body comprising a plurality of compression-moulded and sintered filter plates having high temperature stability. The plates are made from powdered metal, metal filings, metal fibers or a mixture thereof, which are disposed over one another or behind one another, and are spaced by spacers to form a plurality of flow ducts between them. The flow ducts are open on one end and closed on the other, with the walls of the filter plates lying between the inlet and outlet ducts representing filter surfaces. One insert or several inserts consisting of catalytic materials or coated with catalytic materials are inserted into the outlet ducts.

13 Claims, 1 Drawing Sheet

FILTER

BACKGROUND OF THE INVENTION

This invention relates to a filter for the separation of impurities from exhaust gases, and in particular, from exhaust gases of an internal combustion engine, having a filter body consisting of a plurality of compression-moulded and sintered filter plates with high temperature stability made from powdered metal, metal filings, metal fibers or a mixture thereof, which are disposed on top of one another or behind one another respectively, are separated by spacers and form a plurality of flow ducts between them, with the flow ducts being open on one side and closed on the other side so as to form inlet and outlet ducts respectively, and with the walls of the filter plate lying between the inlet and outlet ducts representing filter surfaces.

In the exhaust gases from a diesel engine in particular, there is a plurality of soot particles which can cause problems if, apart from an elimination of the soot from the exhaust gases, one would also wish simultaneously to remove further impurities or harmful exhaust gas constituents by catalytic action.

Thus, for example, a good catalytic function of the conversion of carbon monoxide and hydrocarbons by catalytic materials is not possible when a filter is charged with soot.

Therefore it is known firstly to clean the soot particles from the exhaust gases by a filter, and then to direct the exhaust gases cleaned in this way over a catalyst connected behind said filter. However a disadvantage of this arrangement is that it is very expensive and therefore very uneconomical.

In the prior West German applications P 39 01 609.9 and P 39 37 809.8 from the same applicant, filters have already been proposed, especially for the removal of soot particles, which consist of a plurality of compression-moulded and sintered filter plates with high temperature stability of the type mentioned at the beginning.

The object of the present invention is to create a filter of this type, and to improve it so that both a removal of soot particles, and also a catalytic function for the elimination or conversion of further impurities and harmful constituents in the exhaust gases, is possible in a single filter unit and as far as possible without reciprocal disadvantageous influence.

SUMMARY OF THE INVENTION

This object is achieved according to the invention in that one or several inserts, which are made from catalytic materials or which are coated with catalytic materials, are introduced into the outlet ducts.

By the construction of the filter plates specified by the invention and their arrangement with respect to one another, it has surprisingly become possible to integrate catalytically effective inserts directly into the outlet ducts and, thus, to dispense with a separate filter unit. As before, impurities can become deposited on the filter surface. Thus, a soot conversion can occur in the conventional way on and in the filter surfaces and walls, respectively between the inlet and outlet ducts. After passing through the filter walls separating the inlet ducts from the outlet ducts and, therefore, after a soot conversion, the catalytic action of the inserts may be used to remove the remaining constituents which can be removed or converted by catalytic action, such as, for example, carbon monoxide and hydrocarbon.

By the design specified by the invention, previously cleaned exhaust gases flow over the inserts, as a result of which expensive coating processes or systems connected one behind the other can be dispensed with.

The inserts in the outlet ducts are simply constructed as catalyst plates extending parallel to the direction of flow, which preferably extend over the entire length of the outlet ducts.

In this way the exhaust gases flow along all the surfaces of the catalyst plates on their way to the outlet, and a correspondingly long time is available for the chemical reaction.

By using spacers between the individual filter plates, by which the ducts are formed, the inserts and catalyst plates respectively can be simply integrated into the outlet ducts. Thus, for this purpose the inserts and catalyst plates respectively may be disposed between the ribs, beads or the like of ribs, beads or the like abutting against one another of adjacent filter plates.

If it is simply specified that the filter plates are constructed as waves, the inserts and catalyst plates respectively may be inserted between wave crests and wave troughs of adjacent filter plates with abutting wave crests and wave troughs.

In a very advantageous and not obvious design of the inserts and catalyst plates respectively, it may be specified that they are structured on their surfaces.

By this design there is firstly a greater surface and thus a longer reaction time for the chemical reactions, and secondly, by an appropriate adaptation of the structuring a turbulence effect and thus also a better reaction can be achieved.

Many different embodiments are possible for the structuring. For example, appropriate stamping operations can simply be performed and protrusions and/or depressions, knobs, ribs, wave crests and wave troughs and the like may be formed.

In an advantageous development of the invention, it may be specified that the filter plates be coated on the side of the inlet ducts with catalytically effective materials to lower the soot conversion temperature. In this way the efficiency of the filter is increased.

A very advantageous method of producing the filter specified by the invention may consist in that the inserts and catalyst plates respectively are provided with protrusions and/or depressions on their surfaces.

In this way, a combined filter for the removal of soot, and the removal of other exhaust gas constituents by a catalytic action, may be created in practice in a single operating cycle and thus very cheaply.

The connection of the individual plates together with the inserts and catalyst plates respectively to form one unit may be performed in different ways.

Thus, for example, compression-moulded filter plates and inserts, which are coated with catalytically effective powders, or catalyst plates can be sintered together to form one unit in a common sintering process, with the powder fusing together on the inserts.

However it is also possible to bond compression moulded and already sintered filter plates, between which the catalytically coated inserts and the catalytic plates respectively are inserted, to form one unit.

Likewise the individual compression-moulded and sintered filter plates having the inserts or catalyst plates respectively are connected on the peripheral side by mechanical connection members in such a way that the inlet and outlet ducts are produced as desired.

An exemplified embodiment of the invention is described in principle below by reference to the drawings.

DESCRIPTION OF THE PREFERRED EMBODIMENTS

Figure 1:
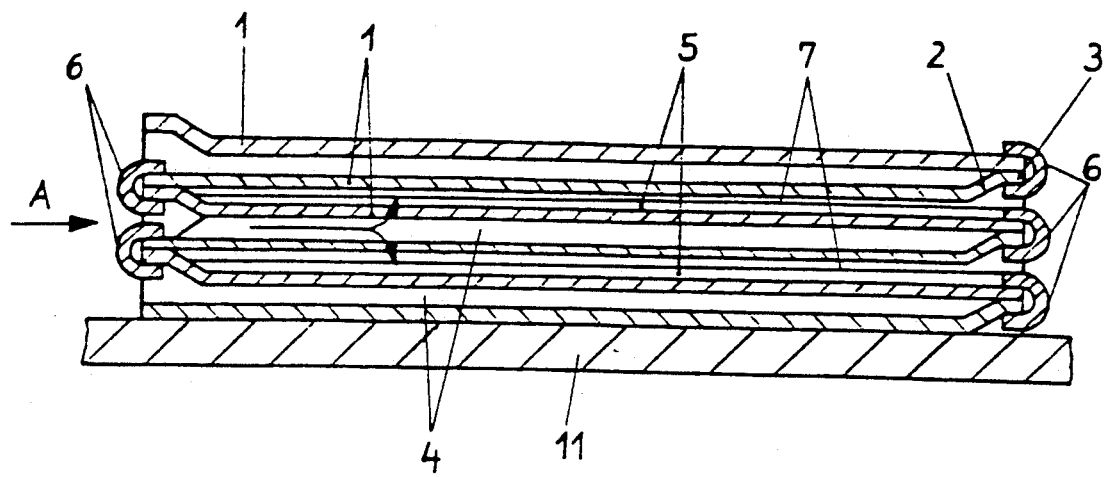
FIG. 1 shows a simplified longitudinal section through the filter as specified by the invention (in detail)
Figure 2:
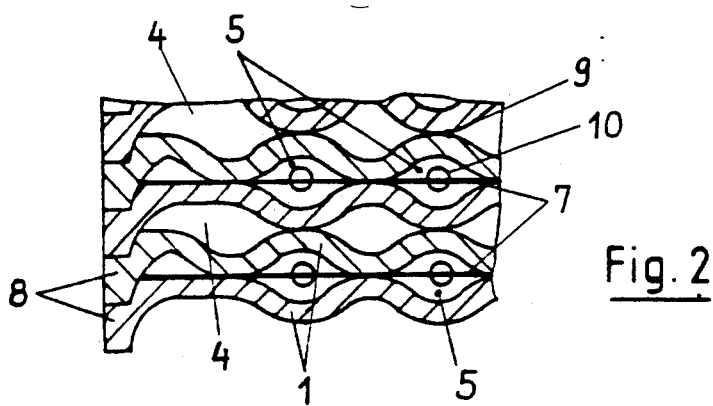
FIG. 2 shows a detailed enlarged representation of an outer or side portion of a cross section of the filter in the transverse direction.

The filter is constructed from a plurality of compression-moulded filter plates 1 with high temperature stability, which are disposed one on top of the other. The filter plates 1 may be sintered and have a waved surface which is such that in the direction of flow (see arrow A in FIG. 1) flow ducts are formed. As seen in FIG. 2, the filter plates 1 have a corrugated planar configuration comprising a plurality of wave crests 9 with a plurality of wave troughs therebetween. In this case the crest of the waves 9 simultaneously form the spacers for the filter plate 1 adjacent thereto so as to form the desired flow ducts between individual filter plates (see FIG. 2).

The filter plates 1 have an identical construction and at one end have a face representing a direct and straight extension of the filter surface, whereas on the other end they have a bend 2 ending in a straight end piece 3, parallel to the surface of the filter plate.

However it is of course possible for bends to be located at both ends.

To produce a filter the desired number of filter plates 1 are laid on top of one another in such a way that one front face with a straight part and one front face with the bend 2 and the end piece 3 lie on top of one another. In this way between adjacent filter plates 1 not only flow channels are formed, but edges are alternately produced on one side of the ducts by the bends 2 or the end pieces 3 respectively. Thus, as clearly seen in FIG. 1, the filter plates are laid against each other in an alternating head-to-toe arrangement.

As is evident, in this way inlet ducts 4 are created which are open on the inlet (on the left side in the drawings) are closed on the outlet end (the right side), while outlet ducts 5 lying between them are closed on the left side, i.e. on the inlet end, and open on the right side, i.e. on the outlet end.

However at the same time as the filter plates 1 are laid one on top of the other, catalyst plates 7 are inserted as inserts between them respectively behind two filter plates 1 laid on top of one another. This is done in such a way that they lie in the outlet ducts 5.

The catalyst plates 7 extend in the direction of flow over the entire length and width of the outlet ducts 5, with them lying on the wave crests and above the wave troughs of filter plates adjacent to one another, as shown most clearly in FIG. 2.

To form a unit and to seal the individual filter plates 1 at their inlet and outlet sides, the filter plates 1 may now be connected to one another in a common sintering process together with the catalyst plates 7. Likewise they may be bonded at their ends to one another or as specified in the prior West German application P 39 37 809.8 and be connected to one another by mechanical means shown here in FIG. 1, for example. The mechanical means may be spring clamps 6, for example, which force together the ends of the filter plates 1. Another method of connection may also be produced by lock seams at the ends of the filter plates, which are accordingly crimped over.

In operation, soot constituents on the filter surfaces and in the porous walls of the filter plates 1 respectively between the inlet ducts 4 and the outlet ducts 5, are separated, with soot conversion or soot carburation occurring. After passing through the filter walls between the inlet ducts 4 and the outlet ducts 5, the exhaust gases precleaned in this way may flow on both sides along the catalyst plates 7 in the outlet ducts 5 to the outlet, with the conversion of further harmful exhaust gas constituents occurring on the basis of the catalytic action of the catalyst plates 7.

Known catalytic materials, such as platinum, vanadium, cobalt, rhodium and the like, may be used as materials for the catalyst plate or for its coating.

As is evident from the enlarged representation in FIG. 2, the catalyst plates 7 are structured on both their surfaces. Corresponding protrusions or knobs 10 are shown.

In order to improve the soot conversion, in particular to reduce the soot conversion temperature, the filter plates may in addition be provided with catalytically effective materials, such as manganese, molybdenum or the like, on their sides closest to the inlet sides.

The lateral sealing of the filter plates may be effected, for example, by an appropriate design-with sealing lips 8, which can be constructed as step-shaped shoulders. In this case sealing may also be effected by bonding, sintering or by a mechanical compression operation.

A part of the filter housing, in which the filter plates 1 are installed, is represented by the plate number 11.

Powdered metal, metal wires, metal fibres or metal filings can be used as the basic material for the filter plates 1. Care just has to be taken so that the walls have adequate porosity, which is achieved either by coarse powdered metal, or even better, by plaiting or tangling the metal wires or metal filings or metal fibers respectively.

A woven cloth or a knitted fabric of metal fibers or metal wires which are sintered together can also be used as a basic material for this purpose. Such a process is described, for example, in the prior West German application P 39 08 581.3.

Such a woven cloth or knitted fabric may also be in strip form, which is then wound in a spiral shape in several turns, with the individual turns being separated by spacers in the strip and flow ducts being formed in this way. The flow ducts then only need to be alternately sealed on the front sides, so that inlet and outlet channels are created, so that the exhaust gases can flow in the axial direction through the cylindrical filter body formed in this way. Such a filter body is described in the prior West German application P 39 10 609.9, for example. Also with such a filter body inserts and catalyst plates respectively can be disposed in the outlet ducts without any problems. For this purpose it is just necessary during the helicoidal winding of the strip when it is produced simultaneously to lap and push in the inserts so that they are respectively located in the outlet ducts.

I claim:

1. A filter, suitable for the separation of impurities from the exhaust gases of an internal combustion engine, including a filter body comprising a plurality of compression-moulded and sintered filter plates made from powdered metal, metal filings, metal fibers or a mixture thereof, which are disposed against one another and separated by spacers to form a plurality of flow ducts therebetween, with the flow ducts being alternately open on one end and closed on the other end so as to form alternating adjacent inlet and outlet ducts with the walls of the filter plates lying between the inlet and outlet ducts providing filter surfaces and the outlet ducts containing catalytic inserts which are made of catalytic materials or which are coated with catalytic materials, said inserts comprising plates extending parallel to said flow ducts and generally extending over the entire length and width of said outlet ducts.

2. A filter according to claim 1 wherein the spacers are formed by ribs, beads or wave crests formed in the filter plates, and the catalytic inserts comprise catalyst plates disposed between said ribs, beads or wave crests which are abutting one another at adjacent filter plates.

3. A filter according to claim 2 wherein the filter plates have a corrugated planar configuration comprising a plurality of wave crests with a plurality of wave troughs therebetween, and the catalyst plates lie between wave crests and wave troughs which are formed by filter plates butting against one another.

4. A filter according to claim 3 wherein said catalyst plates are provided with protrusions on their surfaces.

5. A filter according to claim 1 wherein the filter plates are coated on the side of the inlet ducts with catalytically effective materials to lower the soot conversion temperature.

6. Filter apparatus, suitable for the separation of impurities from the exhaust gases of an internal combustion engine, said apparatus including a filter body having a plurality of inlet and outlet ducts, with the inlet ducts being separated from the outlet ducts by porous filter walls, wherein the filter body comprises a plurality of filter plates having a first end portion which is an extension of a porous filter wall of the filter plate and a second end portion which comprises a straight end section parallel to the first end portion and off-set therefrom by a bent section, with said plurality of filter plates being arranged against each other in an alternating head-to-toe arrangement to provide that said first end portion of a given filter plate is adjacent the second end portion of an adjacent plate and the second end portion of said given filter plate is adjacent the first end portion of another adjacent plate, to thereby form said inlet and outlet ducts therebetween, said first end portion of said given filter plate and the adjacent second end portion of an adjacent filter plate being tightly gripped in a fluid sealing engagement by a clamping element with all inlet ducts thereby open on a first end face of said filter body and closed on a second end face of said filter body, and with all outlet ducts thereby open on said second end face of said filter body and closed on said first end face of said filter body, and said filter body further comprises catalytic inserts within said outlet ducts.

7. Filter apparatus according to claim 6 wherein said catalytic inserts comprise plate elements extending across the full width and along the full length of said outlet ducts.

8. Filter apparatus according to claim 7 wherein said catalytic insert plate elements are coated with or made of catalytically active components.

9. Filter apparatus according to claim 6 wherein the filter plates are provided with sealing lips at the side edges.

10. Filter apparatus according to claim 9 wherein the sealing lips are formed with step-shaped shoulders at the side edges of the filter plates.

11. Filter apparatus according to claim 6 wherein said filter plates have a corrugated planar configuration comprising a plurality of wave crests with wave troughs therebetween for providing said inlet and outlet ducts between adjacent filter plates.

12. Filter apparatus according to claim 6 wherein said filter plates comprise catalytically effective materials.

13. A filter, suitable for the separation of impurities from the exhaust gases of an internal combustion engine, including a filter body comprising a plurality of compression-moulded and sintered filter plates made from powdered metal, metal filings, metal fibers or a mixture thereof, said filter plates being coated on the side of the inlet ducts with catalytically effective materials to lower the soot conversion temperature, said filter plates being disposed against one another and separated by spacers to form a plurality of flow ducts therebetween, with the flow ducts being alternately open on one end and closed on the other end so as to form alternating adjacent inlet and outlet ducts with the walls of the filter plates lying between the inlet and outlet ducts providing filter surfaces and the outlet ducts containing catalytic inserts which are made of catalytic materials or which are coated with catalytic materials, said inserts comprising plates extending parallel to said flow ducts generally extending over the entire length and width of said outlet ducts.

* * * * *